(12) United States Patent
Grinwald et al.

(10) Patent No.: US 9,683,117 B2
(45) Date of Patent: Jun. 20, 2017

(54) INKJET PRINTING

(75) Inventors: Yaron Grinwald, Nes Ziona (IL); Gregory Katz, Nes Ziona (IL); Yana Reznick, Nes Ziona (IL); Tzahi Maswari, Nes Ziona (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 98 days.

(21) Appl. No.: 14/416,987

(22) PCT Filed: Jul. 24, 2012

(86) PCT No.: PCT/EP2012/064531
§ 371 (c)(1),
(2), (4) Date: Jan. 23, 2015

(87) PCT Pub. No.: WO2014/015897
PCT Pub. Date: Jan. 30, 2014

(65) Prior Publication Data
US 2015/0184006 A1    Jul. 2, 2015

(51) Int. Cl.
| | |
|---|---|
| *C09D 11/36* | (2014.01) |
| *B05D 1/26* | (2006.01) |
| *C09D 11/107* | (2014.01) |
| *C09D 11/322* | (2014.01) |
| *G03G 9/13* | (2006.01) |
| *C09D 11/30* | (2014.01) |

(52) U.S. Cl.
CPC ............ *C09D 11/107* (2013.01); *C09D 11/30* (2013.01); *C09D 11/322* (2013.01); *C09D 11/36* (2013.01); *G03G 9/131* (2013.01); *Y10T 428/24901* (2015.01)

(58) Field of Classification Search
CPC ..... C09D 11/36; C09D 11/322; C09D 11/324; C09D 11/326
See application file for complete search history.

(56) References Cited

U.S. PATENT DOCUMENTS 5,112,398 A * 5/1992 Kruse .................. C09D 11/36
                                                          106/31.27
5,192,638 A    3/1993 Landa et al.
(Continued)

FOREIGN PATENT DOCUMENTS

| CN | 101225268 | 7/2008 |
| WO | 0063305 | 10/2000 |

OTHER PUBLICATIONS

International Search Report dated May 3, 2013 for International application No. PCT/EP2012/064531 filed Jul. 24, 2012, Applicant Hewlett-Packard Indigo B.V., Applicant's reference P119554PC00.

*Primary Examiner* — Vu A Nguyen
(74) *Attorney, Agent, or Firm* — Thorpe, North & Western L.L.P.

(57) ABSTRACT

A jettable ink composition comprising a hydrocarbon carrier liquid, colorant comprising pigment particles which are insoluble in the hydrocarbon carrier liquid, and binder resin comprising resin particles which are insoluble in the hydrocarbon carrier liquid; a method of making said jettable ink composition; and an indirect inkjet printing method comprising providing said jettable ink composition, jetting said ink composition on a surface of an intermediate transfer member forming a film comprising an image thereon, and transferring said image to a printable substrate.

17 Claims, 1 Drawing Sheet

(56) References Cited

U.S. PATENT DOCUMENTS

| | | |
|---|---|---|
| 5,365,261 A | 11/1994 | Ozawa et al. |
| 6,337,168 B1 | 1/2002 | Almog |
| 6,547,385 B2 | 4/2003 | Nakajima |
| 6,719,423 B2 | 4/2004 | Chowdry et al. |
| 6,832,832 B2 | 12/2004 | Martin et al. |
| 7,780,773 B2 | 8/2010 | Kovacs et al. |
| 2006/0222985 A1 | 10/2006 | Tsubuko et al. |
| 2011/0003442 A1 | 1/2011 | Wang et al. |
| 2012/0107579 A1* | 5/2012 | Grinwald ............ C09D 11/326 428/195.1 |

* cited by examiner

100 °C   115 °C   125 °C

INKJET PRINTING

Inkjet printing systems involve ejecting ink droplets from orifices in a print head onto a receiving printable substrate (media) to form an image. In direct printing systems, the ink is ejected from jets in the print head directly onto the receiving media. Indirect print inkjet printing is a technique where ink droplets are ejected onto an intermediate transfer member (blanket) rather than directly onto the media. The ink image is thus dried on the intermediate transfer member and is then transferred to the media. In order to facilitate drying of the volatile part of the ink, an oil based formation rather than water based formulation may be used, due, in part, to the lower overall energy of evaporation. Such indirect transfer technique may also enhance compatibility with different types of media.

DETAILED DESCRIPTION

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It is noted that, as used in this specification and the appended claims, the singular forms "a," "an," and "the" include plural referents unless the context clearly dictates otherwise.

As used herein, "jettable ink composition" generally refers to an ink composition in liquid form that is typically suitable for use in an inkjet printing process such as, for example, an indirect inkjet printing process, i.e., a process wherein the print head of the printing device jets ink onto an intermediate transfer surface.

As used herein, "pigment" generally includes pigment colorants, magnetic particles, aluminas, silicas, and/or other ceramics or organo-metallics, whether or not such particulates impart color. Thus, though the present description primarily exemplifies the use of pigment colorants, the term "pigment" can be used more generally to describe not only pigment colorants, but other pigments such as organometallics, ferrites, ceramics, etc.

As used herein, "copolymer" refers to a polymer that is polymerized from at least two monomers.

As used herein, "acidity," "acid number," or "acid value" refers to the mass of potassium hydroxide (KOH) in milligrams that is required to neutralize one gram of a substance. The acidity of a polymer can be measured according to standard 5 techniques, for example as described in ASTM D1386. If the acidity of a particular polymer is specified, unless otherwise stated, it is the acidity for that polymer alone, in the absence of any of the other components of the liquid toner composition.

As used herein, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer, as known in the art. If a melt flow rate of a particular polymer is specified, unless otherwise stated, it is the melt flow rate for that polymer alone, in the absence of any of the other components of the ink composition.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Unless otherwise stated, particle size properties referred to herein are as measured by the well known conventional method employed in the art of laser light scattering, using a Malvern Mastersizer machine as supplied by Malvern Instruments Ltd (or by other methods which give essentially the same result). In the laser light scattering technique, the size of particles in powders, suspensions, dispersions and emulsions may be measured using the diffraction of a laser beam, based on an application of Mie theory. Such a machine provides measurements and a plot of the cumulative percentage by volume of particles having a size, referred to in the art as the 'equivalent spherical diameter' (e.s.d), less than given e.s.d values. The mean particle size $d_{50}$ is the value determined in this way of the particle e.s.d at which there are 50% by volume of the particles which have an equivalent spherical diameter less than that $d_{50}$ value.

Unless otherwise stated, the percentage (%) of components expresses the weight percentage (wt. %) of components.

Unless other wise stated, the molecular weight (MW) of a polymer is the weight average molecular weight.

Unless otherwise stated, any feature described herein can be combined with any aspect described herein or any other feature.

In a first aspect, there is provided a jettable ink composition comprising:
  a hydrocarbon carrier liquid;
  colorant, wherein the colorant comprises pigment particles which are insoluble in the hydrocarbon carrier liquid; and
  binder resin, wherein the binder resin comprises resin particles which are insoluble in the hydrocarbon carrier liquid.

In a second aspect, there is provided an indirect inkjet printing method, comprising
  providing a jettable ink composition comprising:
    a hydrocarbon carrier liquid,
    colorant, wherein the colorant comprises pigment particles which are insoluble in the hydrocarbon carrier liquid, and
    binder resin, wherein the binder resin comprises resin particles which are insoluble in the hydrocarbon carrier liquid;
  jetting said ink composition on a surface of an intermediate transfer member forming a film comprising an image thereon; and
  transferring said image to a printable substrate.

In a third aspect, there is provided a method for making a jettable ink composition, comprising:
  forming a dispersion of binder resin particles in a first hydrocarbon carrier fluid;
  forming a dispersion of pigment particles as colorant in a second hydrocarbon carrier fluid; and
  mixing the dispersions in suitable amounts to form a jettable ink composition.

In a fourth aspect, there is provided a printed media substrate producible by the method of the second aspect. The printed media substrate has a layer comprising binder resin particles and coloured image, and the colored image is formed from a jettable ink composition comprising: a hydrocarbon carrier liquid; colorant comprising pigment particles which are insoluble in the hydrocarbon carrier liquid; and binder resin comprising resin particles which are insoluble in the hydrocarbon carrier liquid.

Hydrocarbon Carrier Liquid

The hydrocarbon carrier liquid is a liquid that comprises a hydrocarbon. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the carrier liquids include, but are not limited to, aliphatic hydrocarbons, isoparaffinic hydrocarbons, paraffinic hydrocarbons, dearomatized hydrocarbon compounds, and the like. In particular, the carrier liquids can include, but are not limited to, Isopar-G™, Isopar-H™, Isopar-L™, Isopar-M™, Isopar-K™, Isopar-10 V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™). In some examples, the carrier liquid comprises or is an isoparaffinic hydrocarbon including, for example, on or more of Isopar-G™, Isopar-H™, Isopar-L™, Isopar-M™, Isopar-K™, Isopar-10 V™ and # Solvent L™.

Carrier liquids of the present disclosure are described in U.S. Pat. Nos. 6,337,168, 6,070,042, and 5,192,638, all of which are incorporated herein by reference.

In some examples, the carrier liquid constitutes about 5 to 99.5% by weight of the ink composition, in some examples 20 to 99.5% by weight of the ink composition, in some examples 50 to 99.5% by weight of the ink composition, in some examples 60 to 99.5% by weight of the ink composition, in some examples 70 to 99.5% by weight of the ink composition in some examples 75% to 99.5% by weight of the ink composition, in some examples, in some examples 80 to 99.5% by weight of the ink composition, in some examples 85 to 99.5% by weight of the ink composition, in some examples 90 to 99.5% by weight of the ink composition. In other examples, the carrier liquid may constitute about 40 to 90% by weight of the ink composition. In other examples, the carrier liquid may constitute about 60 to 80% by weight of the ink composition, in some example about 50 to 70%, in some example about 40 to 60% by weight of the ink composition.

The jettable ink composition comprises a colorant. The colorant comprises pigment particles. In some examples, the pigment is a dispersed pigment, for example, dispersed pigment particles. The colorant may be a pigment selected from a black pigment, a cyan pigment, a yellow pigment, magenta pigment, white pigment, and any combination thereof. Such pigments are known to the skilled person. The pigment may be an inorganic pigment or an organic pigment. When the colorant is dispersed in the carrier liquid it can be any colorant compatible with the carrier liquid and useful for inkjet printing.

In some examples, pigment particles constitute at least about 70% by weight of the colorant, based on the total weight of the colorant, for example, at least about 80% by weight, or at least about 85% by weight, or at least about 90% by weight, or at least about 95% by weight, or at least about 96% by weight, or at least about 97% by weight, or at least about 98% by weight, or at least about 99% by weight, or at least about 99.5% by weight of the colorant. In some examples, the pigment particles constitute about 100% by weight of the colorant.

For example, pigments include, but are not limited to, Helliogen Blue pigment 7080 (available from BASF), Helliogen Green pigment (available from BASF), Cyan pigment (available from Toyo). The pigments can include, but are not limited to, optically variable pigments, thermochromic pigments, photochromic pigments, phosphorescent pigments, electroluminescent pigments, photoluminescent pigments, and combinations thereof. Non limiting examples of pigments are Mogul L (Cabot), Monastral Blue G (CI No. 74160), Toluidine Red Y (CL Pigment Red 3), Quindo Magenta (Pigment Red 122), Dalamar Yellow (Pigment Yellow 74, C.I. No. 11741), Monastral Green B (CI. Pigment Green 7). In another example, the pigments are organic pigments, for example, organic black pigments. In another example, the pigments are organic or inorganic particles as well known in the art. Suitable inorganic pigments include, for example, carbon black. Other inorganic pigments may be suitable such as titanium oxide, cobalt blue ($CoO-Al_2O_3$), chrome yellow ($PbCrO_4$), and iron oxide. Exemplary organic pigments include azo pigments including diazo pigments and monoazo pigments, polycyclic pigments (e.g., phthalocyanine pigments), insoluble dye chelates, nitropigments, nitroso pigments, and the like. Exemplary phthalocyanine blues include copper phthalocyanine blue and derivatives thereof (Pigment Blue 15). Examples of quinacridones include Pigment Orange 48, Pigment Orange 49, Pigment Red 122, Pigment Red 192, Pigment Red 202, Pigment Violet 19 and Pigment Violet 42. Examples of anthraquinones include Pigment Red 43, and Pigment Red 226. Examples of perylenes include Pigment Red 149 (Scarlet), Pigment Red 179, Pigment Red 190, Pigment Violet 19, and Pigment Red 224. Examples of heterocyclic yellows include Pigment Yellow 1, Pigment Yellow 3, Pigment Yellow 17, Pigment Yellow 65, Pigment Yellow 73, Pigment Yellow 74, Pigment Yellow 155, Pigment Yellow 83 and Pigment Yellow 138. Such pigments are commercially available in either powder or press cake form from a number of sources including, BASF Corporation, Engelhard Corporation and Sun Chemical Corporation. Examples of black pigments that may be used include carbon pigments. The carbon pigment is any commercially available carbon pigment that provides acceptable optical density and print characteristics. Exemplary carbon pigments include, without limitation, carbon black, graphite, vitreous carbon, charcoal, and combinations thereof. Such carbon pigments can be manufactured by a variety of known methods such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Exemplary carbon black pigments include, without limitation, Cabot pigments such as Monarch 1400, Monarch 1100, CAB-O-JET 200, Black Pearls, and Vulcan pigments; Columbian pigments such as Raven 7000 and Raven 3500; Degussa pigments such as Color Black FW 200, Raven FW S170, Special Black 6, Special Black 5, Special Black 4, and Printex 140V; and Tipure R-available from Dupont and the like. Examples of other suitable colored pigments are described in the Colour Index, 3rd edition (The Society of Dyers and Colourists, 1982). The above list of pigments includes unmodified pigment particulates, small molecule attached pigment particulates, and polymer-dispersed pigment particulates.

Further examples of pigments include, but are not limited to, those by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200.

In some examples, the colorant may comprise a minor amount of an oil soluble dye. By 'minor amount' is meant that the colorant comprises no more than about 5% by weight of oil soluble dye, based on the total weight of the colorant, for example, less than about 2 wt. %, for example, less than about 1 wt. % of oil soluble dye. In some example, the jettable ink composition is essentially free of oil soluble dye. As used herein, the phrase 'essentially free' refers to the total absence of or near total absence of a specific compound or composition. For example, when an ink composition is said to be essentially free of an oil soluble dye, there is either no oil soluble dye in the composition or only trace amounts of oil soluble dye in the composition. A trace amount is an amount which may be detectable but not quantifiable and moreover, if present, would not adversely affect the properties of the ink composition.

If present, the oil-soluble dye can be any oil-soluble dye compatible with the carrier liquid and useful for inkjet printing. For example, the oil-soluble dye may be a yellow dye, a magenta dye, a cyan dye, a black dye, or any combination thereof.

Exemplary yellow dyes include, but are not limited to, an aryl or heteryl azo dye, an azomethine dye, a methine dye such as a benzylidene dye, a monomethineoxonol dye, a quinone dye such as a naphthoquinone dye, an anthraquinone dye, a quinophthalone dye, a nitro/nitroso dye, an acridine dye, and an acridinone dye. The yellow dye may comprise a counter cation, for example, an inorganic cation such as an alkali metal or ammonium, an organic cation such as pyridinium or quaternary ammonium salt.

Exemplary magenta dyes include, but are not limited to, an aryl or heteryl azo dye which has phenols, naphthols, anilines as a coupling component, an azomethine dye which has pyrazolones, pyrazolotriazoles as a coupling component, a methine dye such as an arylidene dye, a styryl dye, a merocyanine dye, an oxonol dye, a carbonium dye such as a diphenylmethane dye, a triphenylmethane dye, a xanthene dye, a quinone dye such as naphthoquinone, anthraquinone, or anthrapyridone, and a condensed polycyclic dye such as a dioxadine dye. The magenta dyes may comprise a counter cation, for example, an inorganic cation such as an alkali metal or ammonium, an organic cation such as pyridinium or quaternary ammonium salt.

Exemplary cyan dyes include, but are not lmited to, an azomethine dye such as an indoaniline dye, an indophenol dye, a polymethine dye such as a cyanine dye, an oxonol dye, a merocyanine dye; a carbonium dye such as a diphenylmethane dye, a triphenylmethane dye, a xanthene dye, a phthalocyanine dye, an anthraquinone dye; an aryl or heteryl azo dye which has phenols, naphthols, anilines as a coupling component, and an indigo/thioindigo dye. The cyan dyes may comprise a counter cation, for example, an inorganic cation such as an alkali metal or ammonium, an organic cation such as pyridinium or quaternary ammonium salt.

In some examples, the colorant constitutes up to about 20% by weight of the jettable ink composition, for example, up to about 15% by weight, or up to about 10% by weight, or up to about 8% by weight, or up to about 6% by weight, or up to about 4% by weight, or up to about 2% by weight, or up to about 1% by weight. In some examples, the jettable ink composition comprises at least about 0.05% by weight colorant, for example, at least about 0.1% by weight colorant.

The pigment particles will be of size suitable for ink jetting. In some example, the pigment particles will have a particle size of less than about 10 μm, for example, less than about 5 μm, or less than about 1 μm. In some examples, the pigment particles have a $d_{50}$ of less than about 10 μm, for example, less than about 5 μm, or less than about 1 μm. In some example, the pigment particles have a submicron particle size, for example, a $d_{50}$ of less than about 900 nm, or less than about 800 nm, or less than about 700 nm, or less than about 600 nm, or less than about 500 nm. In some example, the pigment particles have a $d_{50}$ of from about at least about 70 nm, for example, from about 70 to about 500 nm, for example, from about 150 to about 500 nm, or from about 150 to about 400 nm, or from about 200 to about 500 nm, or from about 200 to about 400 nm.

Polymeric Binder Resin

The binder resin comprises binder resin particles which are insoluble in the hydrocarbon carrier liquid. In some example, the binder resin particles are dispersed in the hydrocarbon carrier liquid. Advantageously, the binder resin is capable of forming a film (or image), for example, a substantially continuous film (or image), on a surface of an intermediate transfer member (.e.g., blanket), wherein said film (or image) is transferred from the intermediate transfer member to a printable substrate (media), for example, paper.

In some examples, resin particles constitute at least about 70% by weight of the binder resin, based on the total weight of the binder resin, for example, at least about 80% by weight, or at least about 85% by weight, or at least about 90% by weight, or at least about 95% by weight, or at least about 96% by weight, or at least about 97% by weight, or at least about 98% by weight, or at least about 99% by weight, or at least about 99.5% by weight of the binder resin. In some examples, the resin particles constitute about 100% by weight of the binder resin.

The resin can include, but is not limited to, a thermoplastic polymer. In some examples, the resin comprises a polymer having acidic or basic side groups. In some examples, the polymer of the resin may be selected from ethylene acrylic acid copolymers; methacrylic acid copolymers; ethylene vinyl acetate copolymers; copolymers of ethylene (e.g. 80 wt % to 99.9 wt %), and alkyl (e.g. $C_1$ to $C_5$) ester of methacrylic or acrylic acid (e.g. 0.1 wt % to 20 wt %); copolymers of ethylene (e.g. 80 wt % to 99.9 wt %), acrylic or methacrylic acid (e.g. 0.1 wt % to 20.0 wt %) and alkyl (e.g. $C_1$ to $C_5$) ester of methacrylic or acrylic acid (e.g. 0.1 wt % to 20 wt %); ethylene ethyl acrylate; polyesters; polyvinyl toluene; polyamides; epoxy resins; acrylic resins (e.g., copolymer of acrylic or methacrylic acid and at least one alkyl ester of acrylic or methacrylic acid wherein alkyl is in some examples from 1 to about 20 carbon atoms, such as methyl methacrylate (e.g. 50 wt % to 90 wt %)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

The resin may comprise a polymer having acidic side groups. The polymer having acidic side groups may have an acidity of 10 mg KOH/g or more, in some examples an acidity of 20 mg KOH/g or more, in some examples an acidity of 30 mg KOH/g or more, in some examples an acidity of 40 mg KOH/g or more, in some examples an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg 10 KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

Examples of resins include polymer or polymers selected from the Nucrel family (e.g., Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, 15 Nucrel 2806™, Bynell 2002, Bynell 2014, and Bynell 2020 (sold by E. I. du PONT)), and the Lotader family (e.g. Lotader 2210, Lotader, 3430, and Lotader 8200 (sold by Arkema)).

In some examples, the resin comprises a polymer having acidic groups which have been blocked, i.e., to reduce their acidity. Blocking may include esterification of at least a portion of the acid groups or forming metal salts of the acidic side groups. As described below in connection with the third aspect, the blocking of side groups to reduce acidity may also reduce hydrogen bonding such that the resin is more readily grindable to smaller particle sizes suitable for ink-jetting, for example, submicron particle sizes. In some examples, the acidity of the polymer having acidic side groups is reduced by at least about 50% (e.g., the acidity of a polymer having acidic groups and an acidity of about 100 mg KOH/g is reduced to 50 mg KOH/g). In some examples, the acidity of the polymer having acidic side groups is reduced by at least about 60%, or at least about 70%, or at least about 80%, or at least about 90%, or at least about 95%. In some examples, the polymer having blocked acidic side groups has an acidity of 50 mg KOH/g or less, in some examples an acidity of 40 mg KOH/g or less, in some examples an acidity of 30 mg KOH/g or less, in some examples an acidity of 20 mg KOH/g or less, in some examples 15 mg KOH/g or less, in some examples an acidity of 10 mg KOH/g or less, in some examples an acidity of 8 mg KOH/g or less, in some examples an acidity of 6 mg KOH/g or less, in some examples an acidity of 5 mg KOH/g or less, in some examples an acidity of 4 mg KOH/g or less, in some examples an acidity of 3 mg KOH/g or less, in some examples an acidity of 2 mg KOH/g or less, in some examples an acidity of 1 mg KOH/g or less.

In some examples, the binder resin will have a melt flow which enables film forming on the surface of an intermediate transfer member (e.g., blanket) and also which enables transfer of the film from said surface to a printable substrate (e.g., paper). Thus, in some examples, the resin particles may be or comprise a polymer (in some examples a polymer having acidic side groups, in other examples a polymer having at least partially blocked acidic side groups) that has a melt flow rate of less than about 120 g/10 minutes, in some examples about 100 g/10 minutes or less, in some examples about 80 g/10 minutes or less in some examples about 70 g/10 minutes or less, in some examples about 60 g/10 minutes or less, in some examples about 50 g/10 minutes or less, in some examples about 40 g/10 minutes or less, in 20 some examples 30 g/10 minutes or less, in some examples 20 g/10 minutes or less, in some examples 15 g/10 minutes or less, in some examples 10 g/10 minutes or less, in some examples 8 g/10 minutes or less, in some examples 6 g/10 minutes or less, in some examples 5 g/10 minutes or less, in some examples 4 g/10 minutes or less, in some examples 3 g/10 minutes or less, in some examples 2 g/10 minutes or less, in some example, 1 g/10 minutes or less.

In some examples, the binder resin particles may have a viscosity of 5000 cps or more at 190° C., for example, a viscosity of 6000 cps or more, or a viscosity of 7000 cps or more, or a viscosity of 8000 cps or more, or a viscosity of 9000 cps or more, or viscosity of 10000 cps, or a viscosity of 11000 cps or more, or a viscosity of 12000 cps or more at 190° C. Viiscosity can be measured using standard techniques. The viscosity can be measured using a rheometer, e.g. a commercially available AR-2000 Rheometer from Thermal Analysis.

In some examples, the binder resin particles may have a melting point of at least about 60° C., for example, at least about 70° C., or at least about 80° C., or at least about 90° C., or at least about 100° C., or at least about 105° C., or at least about 110° C., or at least about 115° C., or at least about 120° C., or at least about 125° C.

In some examples, the resin particles may be or comprise an ionomer resin. Examples of ionomer resins include copolymers formed with an α-olefin and an α,β-unsaturated carboxylic acid having from about 3 to 8 carbon atoms. In some examples, the copolymer includes 80% by weight or more and 90% by weight or less of an α-olefin, and 10% by weight or more and 20% by weight or less of an α,β-unsaturated carboxylic acid. Examples of other ionomer resins include ternary copolymers formed with an α-olefin, an α,β-unsaturated carboxylic acid having from about 3 to 8 carbon atoms, and an α,β-unsaturated carboxylate ester having 2 to 22 carbon atoms. In some examples, the ternary copolymer includes 70% by weight or more and 85% by weight or less of an α-olefin, 5% by weight or more and 30% by weight or less of an α,β-unsaturated carboxylic acid, and 1% by weight or more and 25% by weight or less of an α,β-unsaturated carboxylate ester.

Examples of the α,β-unsaturated carboxylic acid having 3 to 8 carbon atoms include acrylic acid, methacrylic acid, fumaric acid, maleic acid, and crotonic acid. In some examples, the α,β-unsaturated carboxylic acid is acrylic acid and/or methacrylic acid Examples of the α,β-unsaturated carboxylic acid ester include methyl esters of acrylic acid, methacrylic acid, fumaric acid, maleic acid, and the like; ethyl esters of acrylic acid, methacrylic acid, fumaric acid, maleic acid, and the like; propyl esters of acrylic acid, methacrylic acid, fumaric acid, maleic acid, and the like; n-butyl esters of acrylic acid, methacrylic acid, fumaric acid, maleic acid, and the like; and isobutyl esters of acrylic acid, methacrylic acid, fumaric acid, maleic acid, and the like. In some examples, the α,β-unsaturated carboxylic acid ester is acrylic acid esters and methacrylic acid esters. The carbon number of the α,β-unsaturated carboxylic acid that is the material for the α,β-unsaturated carboxylic acid ester may be equal to or greater than 3 and equal to or less than 8.

In some examples of the copolymer and ternary copolymer the α-olefins are ethylene and/or propyelene and the α,β-unsaturated carboxylic acids are acrylic acid and methacrylic acid. In some example, the ionomer resin is a copolymer formed with ethylene and acrylic acid or methacrylic acid.

In some examples, some of the carboxyl groups (of the copolymer or ternary copolymer) are neutralized with metal ions. Examples of metal ions for neutralizing at least some of the carboxyl include monovalent alkali metal ions such as sodium, potassium, and lithium; bivalent metal ions such as magnesium, calcium, zinc, barium, and cadmium; trivalent metal ions such as aluminum; and other ions such as tin and zirconium. In some example, the metal ions for use in neutralization include sodium ion, potassium ion, lithium ion, zinc ion, calcium ion, magnesium ion, aluminum ion, and neodymium ion. The neutralization may be carried out with two or more types of metal ions. In some example, the metal ions are sodium ion, zinc ion, lithium ion, or magnesium ion.

The ionomer resin may have an acidity of 50 mg KOH/g or less, in some examples an acidity of 40 mg KOH/g or less, in some examples an acidity of 30 mg KOH/g or less, in some examples an acidity of 20 mg KOH/g or less, in some example 15 mg KOH/g or less, in some examples an acidity of 10 mg KOH/g or less, in some examples an acidity of 8 mg KOH/g or less, in some examples an acidity of 6 mg KOH/g or less, in some examples an acidity of 5 mg KOH/g or less, in some examples an acidity of 4 mg KOH/g or less, in some examples an acidity of 3 mg KOH/g or less, in some examples an acidity of 2 mg KOH/g or less, in some examples an acidity of 1 mg KOH/g or less. In some examples the ionomer resin has a 'nil' acidity, i.e., is essentially fully neutralized, for example, at least about 5% neutralized, or at least about 98% neutralized.

In some examples, the ionomer resin has a melt flow rate of less than about 120 g/10 minutes, in some examples about 100 g/10 minutes or less, in some examples about 80 g/10 minutes or less in some examples about 70 g/10 minutes or less, in some examples about 60 g/10 minutes or less, in some examples about 50 g/10 minutes or less, in some examples about 40 g/10 minutes or less, in 20 some examples 30 g/10 minutes or less, in some examples 20 g/10 minutes or less, in some examples 15 g/10 minutes or less, in some examples 10 g/10 minutes or less, in some examples 8 g/10 minutes or less, in some examples 6 g/10 minutes or less, in some examples 5 g/10 minutes or less, in some examples 4 g/10 minutes or less, in some examples 3 g/10 minutes or less, in some examples 2 g/10 minutes or less, in some example, 1 g/10 minutes or less.

Examples of ionomer resins include Himilan 1555, Himilan 1557, Himilan 1605, Himilan 1706, Himilan 1707, Himilan 1856, Himilan 1855, Himilan AM7311, Himilan AM7315, Himilan AM7317, Himilan AM7318, Himilan AM7329, Himilan MK7320, and Himilan MK7329, available from Du Pont-MITSUI POLYCHEMICALS Co., Ltd.; Surlyn 6120, Surlyn 6910, Surlyn 7930, Surlyn 7940, Surlyn 8140", Surlyn 8150, Surlyn 8940, Surlyn 8945, Surlyn 9120, Surlyn 9150, Surlyn 9910, Surlyn 9945, Surlyn AD8546, HPF1000, and HPF2000, available from E.I. du Pont de Nemours and Company; IOTEK 7010, IOTEK 7030, IOTEK 7510, IOTEK 7520, IOTEK 8000, and IOTEK 8030, available from ExxonMobil Chemical Corporation; and Aclyn 201, Aclyn 246, Aclyn 285, and Aclyn 295, available from Honeywell.

In some examples, the binder resin constitutes from about 0.1 to about 70% by weight of the jettable ink composition, for example, from about 0.5 to about 50% by weight, or from about 1 to about 40% by weight, or from about 1 to about 30% by weight, or from about 1 to about 25% by weight, or from about 1 to about 20% by weight, or from about 1 to about 15% by weight, or from about 1 to about 10% by weight. In further examples, the polymeric binder resin constitutes at least about 2% by weight, or at least about 3% by weight, or at least about 4% by weight, or at least about 5% by weight, or at least about 6% by weight, or at least about 7% by weight, or at least about 9% by weight of the jettable ink composition.

As described above, the jettable ink composition is suitable for use in an inkjet printing process such as, for example, an indirect inkjet printing process, i.e., a process wherein the print head of the printing device jets ink onto an intermediate transfer surface. In some examples, the jettable ink composition has a viscosity which is equal to or less than about 50 cps at the operating temperature of the ink-jet printing process in which the jettable ink composition is to be employed, for example, equal to or less than about 40 cps, or equal to or less than about 30 cps, or equal to or less than about 25 cps, or equal to or less than about 20 cps, or equal to or less than about 15 cps, or equal to or less than about 10 cps. In some example, the jettable ink composition has a viscosity of at least about 1 cps, for example, at least about 5 cps at the operating temperature of the ink-jet printing process in which the jettable ink composition is to be employed. Operating temperatures may vary between room temperature, e.g., about 20° C. to about 150° C., for example, equal to or less than about 140° C., or equal to or less than about 130° C., or equal to or less than about 125° C., or equal to or less than about 100° C., or equal to or less than about 80° C., or equal to or less than about 60° C., or equal to or less than about 40° C., or equal to or less than about 30° C. In some examples, room temperature is about 18° C., or about 19° C., or about 20° C., or about 21° C., or about 22° C., or about 23° C., or about 24° C., or about 25° C.

The viscosity of the jettable ink composition may vary depending on, for example, the type and molecular weight of the binder resin. Thus, in some examples, the jettable ink composition may contain additives to adjust (i.e., to increase or decrease) the viscosity of the jettable ink composition, for example, viscosity modifier(s). In some examples, the viscosity of the jettable ink composition is varied using dispersant described below. Advantageously, the use of dispersants may additionally serve to stabilise any solid particles, e.g., dispersed particles of pigment colorant or other non-volatile substances (NVS), comprised in the jettable ink composition.

In some examples, the dispersant may constitute from about 0.5 to about 50% by weight of the ink composition, for example, from about 1 to about 40% by weight, or from about 1 to about 30% by weight, or from about 1 to about 25% by weight, or from about 5 to about 20% by weight, or from about 5 to about 15% by weight of the ink composition. The dispersant may comprise a mixture of two or more different dispersants.

Exemplary dispersants generally include molecules with a polar portion and a non-polar portion. The dispersant may be oil-soluble. The surfactant may be soluble in the hydrocarbon carrier liquid. The dispersant typically will have a head group and tail group typically of different polarity, e.g. the head group being polar and the tail group being relatively non-polar compared to the head group. The dispersant may comprise an acidic head group, e.g. a head group comprising a carboxylic acid, or a quaternary amine. The dispersant may comprise a basic head group. The basic head group may comprise an amine group, which may be selected from a primary amine group and a secondary amine group. The basic head group may comprise a plurality of amine groups, which may each independently be selected from a primary amine group and a secondary amine group.

In some examples, the dispersant may be selected from anionic dispersant, cationic dispersant, amphoteric dispersant, non-ionic dispersant, polymeric dispersant, oligomeric dispersant, crosslinking dispersant, or combinations thereof. In some examples the dispersant comprises or is a polymeric dispersant, for example, a polymeric dispersant with an amine head group.

In some examples, the dispersant comprises or is a succinimide. The succinimide may be linked, e.g. via a hydrocarbon-containing linker group, to an amine group. In some examples, the surfactant comprises a polyisobutylene succinimide having a head group comprising an amine. Exemplary polyisobutylene succinimides include OLOA-1200® (Chevron Oronite), Lubrizol®6406 and Lubrizol®2153 (Lubrizol).

In some examples, the dispersant comprises or is a polyamide-based dispersing agent that has a main chain structure having pendant therefrom a plurality of side chains composed of polyesters. The main chain comprises a plurality of nitrogen atoms such as polyethyleneimine and has a plurality of side chains that are bonded to the nitrogen atoms through amide-linkage in which the side chains are polyesters. Examples thereof include dispersing agents with a structure that has a main chain formed of polyalkyleneimine such as polyethyleneimine to which poly(carbonyl-$C_{3-6}$-alkyleneoxy) chains are bonded as side chains through amide-linkage in which the poly(carbonyl-$C_{3-6}$-alkyleneoxy) chains each contain 3 to 80 carbonyl-$C_{3-6}$-alkyleneoxy groups. Such polyamide-based dispersants are commercially available as Solsperse 11200® and Solsperse 28000® made by Lubrizol.

Other suitable dispersants include basic functional polyester dispersants, such as Solsperse 13300® and Solsperse 17000®, both made by Lubrizol.

In some example, the dispersant comprises or is a modified fatty-acid, for example, a fatty-acid modified polyester. The fatty acid component may be stearic acid or a metal salt thereof, e.g., calcium or aluminum. Such dispersants are commercially available as Efka 6220 and Efka-6225 made by BASF.

In some examples, the dispersant comprises or is an acrylic block copolymer, for example, a polyacrylate and/or derivatives thereof. Such dispersants are commercially available as Efka 4300 made by BASF.

The anionic dispersant may be or comprise sulfosuccinic acid and derivatives thereof such as, for instance, alkyl sulfosuccinates (e.g., GEROPON® SBFA-30 and GEROPON® SSO-75, both of which are manufactured by Rhodia, Boulogne-Billancourt, France) and docusate sodium.

The cationic dispersant may be selected from quaternary amine polymers, protonated amine polymers, and polymers containing aluminum (such as those that are available from Lubrizol Corp., Wickliffe, Ohio). Further examples of cationic dispersants include SOLSPERSE® 2155, 9000, 13650, 13940, and 19000 (Lubrizol Corp.) and other like cationic dispersants.

The amphoteric dispersant may be selected from dispersants that contain compounds having protonizable groups and/or ionizable acid groups. An example of a suitable amphoteric dispersant includes lecithin.

The non-ionic dispersant may be selected from oil-soluble polyesters, polyamines, polyacrylates, polymethacrylates (such as, e.g., SOLSPERSE® 3000 (Lubrizol Corp.), SOLSPERSE® 21000 (Lubrizol Corp.), or the like.

The oligomeric dispersant may be selected from low average molecular weight (i.e., less than 5000, or less than about 4000, or less than about 3000, or less than about 2000, or less than about 1000) non-ionic dispersant.

The cross-linking dispersant may be selected from polymers or oligomers containing two or more carbon double bonds (C=C) and/or free amine groups such as, e.g., polyamines, crosslinkable polyurethanes, and divinyl benzene.

Other suitable dispersant include OS#13309AP, OS#13309AQ, 14179BL, and 45479AB from Lubrizol Corp, which are dispersants based on polyisobutylene succinic acid with polyethyleneimines. These dispersants are combination polymers that are cationic in nature.

When present, suitable viscosity modifiers include any substance or composition which is capable of increasing of decreasing the viscosity (cps) of the jettable ink composition. In some examples, the viscosity modifier is an oil-soluble polymer and may have a relatively low molecular weight (MW), for example, a weight average molecular weight of less than about 4K g/mol, or less than about 3K g/mol, or less than about 2.5 K g/mol, or less than about 2K g/mol, or less than about 1.5K g/mol, or less than about 1K g/mol. The oil-soluble viscosity modifier may be a petroleum resin, such as aliphatic hydrocarbon resin, aromatic modified aliphatic hydrocarbon resin, and/or aromatic modified cycloaliphatic hydrocarbon resins. Exemplary petroleum resins include the Escorez™ 1000, 2000 and 5000 series, available from ExxonMobil®. When present, the viscosity modifier is added in an amount sufficient to modify (i.e., increase or decrease) the viscosity of the jettable ink composition in a desired manner. In some examples, viscosity modifier may be added in order to increase the viscosity of the jettable ink composition. The viscosity modifier may be solubilised in a hydrocarbon carrier liquid, such as those described above, and then added to the jettable ink composition. In some examples, a sufficient amount of viscosity modifier is added to obtain a jettable ink composition having a viscosity of at least about 2 cps at 25° C., for example, a viscosity of from 2 to about 50 cps at 25° C., or from about 5 to about 40 cps at 25° C., or from about 5 to about 30 cps at 25° C., or from about 5 to about 25 cps at 25° C., or from about 5 to about 20 cps at 25° C., or from about 5 to about 15 cps at 25° C., or from about 5 to about 10 cps at 25° C. In some example, the viscosity modifier constitutes from about 0.1 to about 10% by weight of the jettable ink composition, for example, from about 0.1 to about 8% by weight of the jettable ink composition, for example, from about 0.3 to about 6% by weight, or from about 0.5 to about 5% by weight, or from about 0.5 to about 5% by weight, or from about 0.5 to about 3% by weight, or from about 0.5 to about 2% by weight of the jettable ink composition.

In some examples, the method of the second aspect is implemented on a printing machine, in which one or more, for example, four, inkjet print heads define the image to be printed by dispensing, e.g., projecting, said ink onto an intermediate transfer surface. In some examples, the intermediate transfer surface is the surface of an intermediate transfer member, which may have the form of a cylinder, for example, a drum or roller. The surface on which the image is formed may be on a rotating member, e.g. in the form of a drum or cylinder. The intermediate transfer member may be a rotating flexible member, which may be heated, e.g. to a temperature of from 50 to 160° C., in some examples, from 80 to 130° C. The surface may be the surface of a blanket material placed on the intermediate transfer member. The blanket material may include silicone coated polyester, silicone coated rubber, silicone coated paper, silicone-coated aluminium, or other suitable materials than can receive the jettable ink in the desired manner (i.e., such that a (continuous) film comprising an image is formed which is then transferrable to a printable media substrate.

In some examples, the jettable ink composition dries on the intermediate transfer surface forming a continuous film comprising an image. The intermediate media transfer surface then contacts a printable media substrate (e.g., a sheet of paper), at which stage the film comprising the image is transferred to the printable media substrate. Non-limiting examples of such inkjet printing techniques include thermal, acoustic, and piezoelectric inkjet printing The printable media substrate may be or comprise any suitable substrate. The printable media substrate may be any suitable substrate capable of having an image printed thereon. The printable media substrate may comprise a material selected from an organic or inorganic material. The material may comprise a natural polymeric material, e.g. cellulose. The material may comprise a synthetic polymeric material, e.g. a polymer formed from alkylene monomers, including, but not limited to, polyethylene and polypropylene, and copolymers such as styrene-polybutadiene. The polypropylene may in some examples be biaxially orientated polypropylene. In some examples, the printable media substrate comprises a cellulosic paper. In some examples, the cellulosic paper is coated with a polymeric material, e.g. a polymer formed from styrene-butadiene resin. In some examples, the cellulosic paper comprises a filler material, for example, an inorganic material which may be bound a polymeric material. The inorganic material may be selected from, for example, kaolinite or calcium carbonate. The printable media substrate is in some examples a cellulosic print medium such as paper. The cellulosic print medium is in some examples a coated cellulosic print medium, e.g. having a coating of a polymeric material thereon.

The method of the second aspect may be carried out so that a plurality of impressions or copies are carried out. The number of impressions or copies may be at least 1000, in some examples at least 2000, in some examples at least 3000, in some examples at least 5000. The print coverage on each printed media substrate in each impression may be 40% or less, in some examples 30% or less, in some examples 20% or less. An impression may be a single image of one colour formed on a print substrate. A copy may be a single image having a plurality of colours, e.g. selected from black, magenta, cyan and yellow.

The method of the second aspect may be carried out so that a plurality of print media sheets are printed, for example 250 or more print media sheets, in some examples 500 or more print media sheets, in some examples 750 or more print media sheets, in some examples 1000 or more print media sheets. The sheets may be any suitable size or shape, e.g. of standard printing size, such as A4 or A3.

As used herein, "image" or "images" refers to marks, signs, symbols, figures, indications, and/or appearances deposited on a printable media substrate. Examples of an image may include characters, words, numbers, alpha-numeric symbols, punctuation, text, lines underlines, highlights, and the like.

In some examples, the jettable inks and methods of the invention are utilized using an inkjet set comprising or consisting of magenta, cyan, yellow and black inks.

In some examples, the jettable ink composition comprises an amount of non-volatile substances (VNS), other than the polymer binder resin. NVS are components of the ink which do not evaporate on drying on when applied to the intermediate transfer surface. NVS include solid particles, for example, pigment particles.

In some example, the jettable ink composition comprises other types of additives which may be employed in the ink composition to optimize the properties of said ink composition. For example, the ink composition may also include any number of surface modifiers and any additional additives.

The jettable ink compositions may be made according to the following methods. Thus, in accordance with the method of the third aspect, a dispersion of pigment particles in a first hydrocarbon carrier liquid and a dispersion of binder resin particles in a second hydrocarbon carrier liquid are prepared separately and then mixed in suitable amounts to obtain a jettable ink having a desired composition.

In some examples, the first and second hydrocarbon carrier liquids are the same and may be selected from any of the hydrocarbon carrier liquids described above in connection with the first and second aspects. In some examples, the first and second hydrocarbon carrier liquids are different and may be selected from any of the hydrocarbon carrier liquids described above in connection with the first and second aspects. In an example, the first and second hydrocarbon carrier liquid is or comprises isoparaffinic hydrocarbon including, for example, Isopar-G™, Isopar-H™, lsopar-L™, Isopar-M™, Isopar-K™, Isopar-10 V™ and # Solvent L™.

In some examples, the dispersion of pigment particles (including any of the pigments described above in connection with the first and second aspects, and examples thereof) and the dispersion of binder resin particles (including any of the binder resins described above in connection with first and second aspects, and examples thereof) are prepared in the presence of a dispersant. The dispersant may be any of the dispersants described above in connection with the first and second aspects, and examples thereof. In some examples, other components such as surface modifiers and additives may be added at this stage.

In some examples, resin particles and the first hydrocarbon liquid, and/or pigment particles and the second hydrocarbon carrier liquid, respectively, are combined and milled/ground to form the dispersion. The dispersant, when present, may be added before, during or after milling/grinding. The hydrocarbon carrier liquid used to prepare the pigment dispersion and binder resin dispersion may be the same or different, typically the same for any given ink composition.

In some examples, the grinding or milling process is thermally controlled, e.g., to maintain a constant temperature during the grinding process. The temperature may be room temperature or, for example, about 25° C. In some example, the temperature is maintained (i.e., kept constant) at any temperature between about 20 and 80° C., for example, between about 25 and 60° C. or, for example, between about 25 and 40° C., or between about 25 and 35° C., or between about 30 and 40° C.

In some examples, the hydrocarbon carrier liquid, pigment particles, binder resin particles and, when present, dispersant, are mixed in a mixer (e.g., double planetary mixer and the like). In some example, the milling/grinding is made with a grinder or mill, e.g., an attritor (e.g., an 51 attriotr made by Union Proces), a disk mill, sand mill, a ball mill, a bead mill, an impeller attrition mill, a vibro-energy mill, or the like, and milled/ground for a period of time to form the dispersion. In some examples, the mixture of binder resin/hydrocarbon carrier liquid/dispersant and/or the mixture of pigment particles/hydrocarbon carrier liquid/dispersant are ground/milled for a period of time to form a dispersion and to obtain a dispersion in which dispersed particles (e.g., resin particles or any other solid particles present in the mixture) have a mean particle size oft less than about 10 μm, for example, less than about 5 μm, or less than about 1 μm. In some example, the mean particle size of the ionomer resin is reduced to a submicron particle size, for example, a $d_{50}$ of less than about 900 nm, or less than about 800 nm, or less than about 700 nm, or less than about 600 nm, or less than about 500 nm; in some examples, a $d_{50}$ of from about at least about 70 nm, for example, from about 70 to about 500 nm, for example, from about 150 to about 500 nm, or from about 150 to about 400 nm, or from about 200 to about 500 nm, or from about 200 to about 400 nm.

In some examples, the mixture of binder resin/hydrocarbon carrier liquid/dispersant and/or the mixture of pigment particles/hydrocarbon carrier liquid/dispersant are ground/milled for a period of time of from about 10 mins to about 20 hours, for example, from about 30 mins to about 15 hours, or from about 1 hour to about 12 hours, or from about 2 hours to about 12 hours, or from about 3 hours to about 12 hours, or from about 4 hours to about 10 hours, or in some example, at least about 5 hours, or at least about 6 hours, or at least about 7 hours, or at least about 8 hours.

In some examples, the mixture of pigment particles/hydrocarbon carrier liquid/dispersant are ground/milled for a period of time of from about 15 mins to about 6 hours, for example, from about 15 mins to about 5 hours, or from about 30 mins to about 5 hours, or from about 45 mins to about 5 hours, or from about 1 hour to about 5 hours, or from about 1 hour to about 4 hours, or from about 2 hours to about 5 hours, or from about 3 hours to about 5 hours, or from about 4 hours to about 5 hours.

In some examples, revolutions per minute (RPM) range from about 50 to about 1000, for example, from about 100 to about 900, or from about 200 to 800, or from about 300 to about 700, or at least about 400, or at least about 500, or at least about 600. A person of sill in the art will understood that the grinding time and the grinding speed will vary depending on the amount of material to be ground, the desired viscosity and/or the desired particle size of solid particles in ink composition, and the size and type of the grinding/milling apparatus.

The milling/grinding process may be carried out with or without grinding media, such as zirconia or stainless steel balls. The grinding media may be relatively fine, e.g., balls/beads having a diameter of less than about 1 mm, for example, less than about 0.2 mm, for example, equal to or less than about 0.6 mm. In some example, the grinding media has a diameter of at least about 0.05 mm, for example, at least about 0.075 mm, for example, equal to or greater than about 0.1 mm. In some examples, the grinding media include table salt, glass beads, zirconia beads, ceramic beads, plastic beads, or stainless steel beads. In one example, the grinding/milling is carried out using a ball mill with zirconia beads as the grinding media.

At any stage of the method for preparing the ink composition, further dispersant may be added to modify or enhance the stability of the ink composition, and/or to modify the viscosity of the ink composition.

In some example, the total solids content during milling/grinding to form the dispersion of pigment particles or dispersion of binder resin particles is less than about 40% by weight, for example, less than about 30% by weight, for example, less than about 25% by weight, for example, less than about 20% by weight, for example, less than about 15% by weight, for example, less than about 10% by weight.

In some examples, the binder resin particles may be or comprise an ionomer resin, including any of the ionomer resins described above. In some examples, the ionomer resin, prior to forming the dispersion of binder resin particles in the hydrocarbon carrier liquid, comprises particles having a mean particle size ($d_{50}$) of at least about 1 μm, for example, at least about 10 μm, or at least about 50 μm, or at least about 100 μm, or at least about 150 μm. In some examples, the ionomer resin is a copolymer formed with ethylene and acrylic acid or methacrylic acid, for example, Aclyn 295.

In some examples, the binder resin particles comprise an ionomer resin, and forming a dispersion of binder resin particles in said first hydrocarbon resin comprises grinding/milling said ionomer resin in the presence of a dispersant for a period of time to reduce the mean particle size ($d_{50}$) of the ionomer to less than 10 μm, for example, less than about 5 μm, or less than about 1 μm. In some examples, the mean particle size of the ionomer resin is reduced to a submicron particle size, for example, a $d_{50}$ of less than about 900 nm, or less than about 800 nm, or less than about 700 nm, or less than about 600 nm, or less than about 500 nm; in some examples, a $d_{50}$ of from about at least about 70 nm, for example, from about 70 to about 500 nm, for example, from about 150 to about 500 nm, or from about 150 to about 400 nm, or from about 200 to about 500 nm, or from about 200 to about 400 nm.

In some examples, the binder resin particles are derived from a polymer having acidic groups, and the method further comprises blocking at least a portion of said acidic side groups to reduce their acidity prior to forming a dispersion of binder resin particles in said first hydrocarbon carrier liquid. As described below in connection with the first and second aspect, the blocking of side groups to reduce acidity may also reduce hydrogen bonding such that the resin is more readily grindable to smaller particle sizes suitable for ink-jetting, for example, submicron particle sizes. In some example, the acidity of the polymer having acidic side groups is reduced by at least about 50% (e.g., the acidity of a polymer having acidic groups and an acidity of about 100 mg KOH/g is reduced to 50 mg KOH/g). In some example, the acidity of the polymer having acidic side groups is reduced by at least about 60%, or at least about 70%, or at least about 80%, or at least about 90%, or at least about 95%. In some example, the polymer having blocked acidic side groups has an acidity of 50 mg KOH/g or less, in some examples an acidity of 40 mg KOH/g or less, in some examples an acidity of 30 mg KOH/g or less, in some examples an acidity of 20 mg KOH/g or less, in some example 15 mg KOH/g or less, in some examples an acidity of 10 mg KOH/g or less, in some examples an acidity of 8 mg KOH/g or less, in some examples an acidity of 6 mg KOH/g or less, in some examples an acidity of 5 mg KOH/g or less, in some examples an acidity of 4 mg KOH/g or less, in some examples an acidity of 3 mg KOH/g or less, in some examples an acidity of 2 mg KOH/g or less, in some examples an acidity of 1 mg KOH/g or less.

The dispersions of pigment and binder resin are mixed in suitable amounts to form a jettable ink composition. The relative amount of each dispersion in the mixture will depend on the desired composition of the jettable ink composition. In some examples, the weight ratio of pigment particles to binder resin may be from about 10:1 to about 1:10, for example, from about 1:1 to about 1:10, for example, from about 1:2 to about 1:10, for example, from about 1:3 to about 1:10, for example, from about 1:4 to about 1:10, for example, about 1:1, or about 1:2, or about 1:3, or about 1:4, or about 1:5.

In some examples, the binder resin particles swell at least 10% in the hydrocarbon carrier liquid, for example, the binder resin particles swell from about 10-30% in the hydrocarbon carrier liquid. The dispersion of binder resin particles in hydrocarbon carrier liquid may be in the form of paste at processing temperatures, for example, between about 50 and 130° C. Without wishing to be bound by theory, in some examples, if the dispersion of binder resin particles in hydrocarbon carrier liquid is paste-able in a temperature range of 130-50° C., this is indicative of good transfer via an intermediate media transfer member.

The jettable ink composition may be formed by vigorously agitating the mixture of dispersions, e.g., by shearing. Agitation/shearing may be conducted by conventional means such as ultrasonic dispersers, or high speed mechanical mixers such as Rotor/stator mixer, Ystral® or Ultra Turrax®. Agitation/shearing may be carried for a period of time sufficient to form the jettable ink composition. For example, the high speed mechanical mixer may be operated at a speed of at least about 5000 rpm, for example, at least about 10,000 rpm, or at least about 15,000 rpm, or equal to or greater than about 20,000 rpm, for a period of up to about 60 minutes, or up to about 30 minutes, or up to about 20 minutes, or up to about 10 minutes, or for about 9 minutes, or about 8 minutes, or about 7 minutes, or about 6 minutes, or about 5 minutes, or about 4 minutes, or about 3 minutes, or about 2 minutes. In some examples, the period of time is at least about 30 seconds, for example, at least about 1 minute.

As described above, in some examples, a sufficient amount of viscosity modifier is added to obtain a jettable ink composition having a viscosity of at least about 2 cps at 25° C., for example, a viscosity of from 2 to about 50 cps at 25° C., or from about 5 to about 40 cps at 25° C., or from about 5 to about 30 cps at 25° C., or from about 5 to about 25 cps at 25° C., or from about 5 to about 20 cps at 25° C., or from about 5 to about 15 cps at 25° C., or from about 5 to about 10 cps at 25° C.

In accordance with the fourth aspect, the printed media substrate producible by the method of the second aspect has a layer comprising binder resin particles and coloured image. The colored image is formed from a jettable ink composition comprising: a hydrocarbon carrier liquid; colorant comprising pigment particles which are insoluble in the hydrocarbon carrier liquid; and binder resin comprising resin particles which are insoluble in the hydrocarbon carrier liquid. In some example, the colored image is formed from a jettable ink composition according to the first aspect, and examples thereof.

EXAMPLES

The following examples illustrate a number of variations of the present compositions and methods that are presently known to the inventors. However, it is to be understood that the following are only exemplary or illustrative of the application of the principles of the present compositions and methods. Numerous modifications and alternative compositions and methods may be devised by those skilled in the art without departing from the spirit and scope of the present compositions and methods. The appended claims are intended to cover such modifications and arrangements.

Thus, while the present compositions and methods have been described above with particularity, the following examples provide further detail in connection with what are presently deemed to be acceptable.

Example 1a

A cyan pigment (from Toyo™ Ink) was dispersed in Isopar-L by circulating in a ball mill (Eiger) with fine media (0.1-0.6 mm) and high RPM for 3 hours, maintaining a constant temperature of 25° C. Dispersant (Lubrizol6406; OS199431)) was added with the pigment at 10% on solids. The pigment concentration during grinding was 5-18%.

Example 1b

A magenta pigment (from Clariant®) was dispersed in Isopar-L by circulating in a ball mill (Eiger) with fine media (0.1-0.6 mm) and high RPM for 4 hours, maintaining a constant temperature of 25° C. Dispersant (Lubrizol6406; OS199431)) was added with the pigment at 10% on solids. The pigment concentration during grinding was 10-30%.

Example 2

Aclyn 295 resin (ionomer of ethylene/acrylic acid copolymer which is 98% neutralized with zinc, having a 'nil' acidity) was added (25-30 wt. %, based on) to an 51 attritor (made by Union Process) with dispersant (OS199431, made by Lubrizol) at 15% on solids, and Solvent-L™. The Aclyn 295 had a $d_{50}$ of 160 μm prior to grinding and a $d_{50}$ of about 0.12 μm after grinding. % non-volatile solids during grinding was 18%. Grinding was carried out for 12 hours at 36° C.

Example 3

A jettable ink composition was prepared from the cyan pigment dispersant of Example 1a and the binder resin dispersion of Example 2 by mixing under high shear conditions in a TKA T25 digital Ultra-Turrax (RPm varied from 10,000-16000 over a 3 minute period. The pigment concentration was 2.5% and the resin concentration was 10% (1:4 ratio). Viscosity was about 2 cps at 25° C.

Viscosity modifier (Escorez (from ExxonMobil® dissolved in Isopar-L) was added to the mixture. The concentration of viscosity modifier was 15%. This increased the viscosity from 2 cps to 6 cps.

Example 4

The jettable ink of Example 4 was tested for transferability at 100° C., 115° C. and 125° C. Results are presented in FIG. 1. The printed papers presented in FIG. 1 are a monochromatic version of the cyan colored printed papers.

Paper was printed in an indirect inkjet printing machine, in which the ink was jetted onto an intermediate transfer blanket and then transferred to the paper. Ink coverage levels were varied from about 100% (topmost image in each series) to about 50% (lowermost image in each series).

Figure 1:
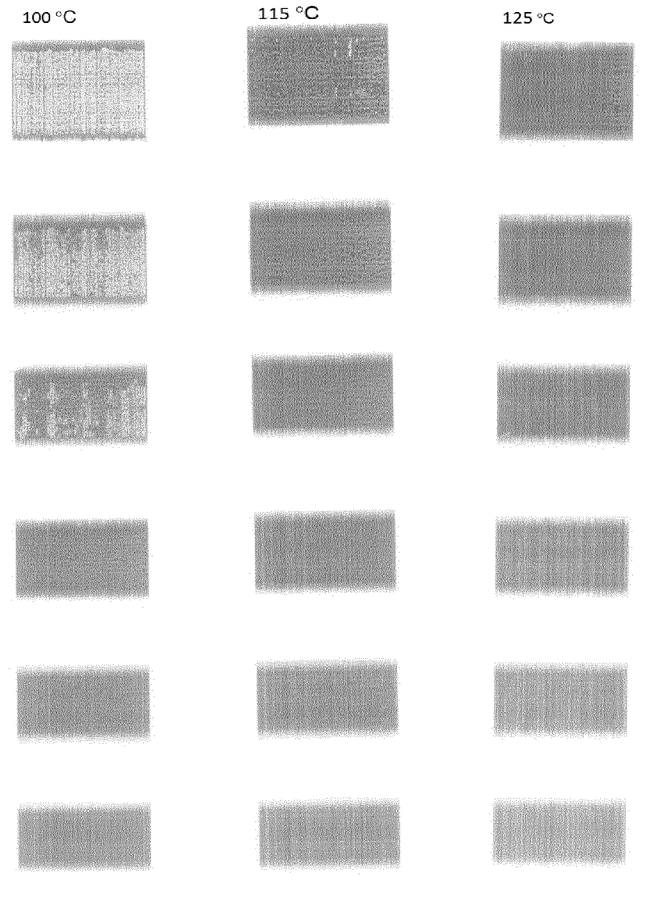
FIG. 1 shows jetting results for a exemplary ink composition, as prepared in the Examples.

As can be seen from FIG. 1, at 115° C. and 125° C., good transferability to paper was achievable for a range of ink coverage levels. At 110° C., although transferability was not as good at the highest ink coverage levels (i.e., as shown in the first three images at 110° C.) compared to transferability at 115° C. and 125° C.), transferability improved as the ink coverage decreased (i.e., as shown in the lower three images).

The invention claimed is:

1. A jettable ink composition comprising:
    a hydrocarbon carrier liquid;
    colorant, wherein the colorant comprises pigment particles which are insoluble in the hydrocarbon carrier liquid and wherein the pigment particles are dispersed in the hydrocarbon carrier liquid, and wherein the colorant further comprises an oil soluble dye; and
    binder resin, wherein the binder resin comprises resin particles which are insoluble in the hydrocarbon carrier liquid and wherein the resin particles are dispersed in the hydrocarbon carrier liquid.

2. The jettable ink composition according to claim 1, wherein the resin particles comprise a polymer selected from: ethylene acrylic acid copolymers; methacrylic acid copolymers; ethylene vinyl acetate copolymers; copolymers of ethylene and alkyl ester of methacrylic or acrylic acid; copolymers of ethylene, acrylic or methacrylic acid and alkyl ester of methacrylic or acrylic acid; ethylene ethyl acrylate; polyesters; polyvinyl toluene; polyamides; epoxy resins; acrylic resins; ethylene-acrylate terpolymers: ethylene-acrylic esters-maleic anhydride (MAH); glycidyl methacrylate (GMA) terpolymers; ethylene-acrylic acid ionomers and combinations thereof.

3. The jettable ink composition according to claim 1, wherein the resin particles are derived from a polymer having acidic groups, at least a portion of which have been blocked to reduce their acidity.

4. The jettable ink composition according to claim 1, wherein the resin particles comprise an ionomer resin.

5. The jettable ink composition according to claim 1, further comprising a dispersant selected from anionic dispersant, cationic dispersant, amphoteric dispersant, nonionic dispersant, polymeric dispersant, oligomeric dispersant, crosslinking dispersant, or combinations thereof.

6. The jettable ink composition according to claim 1, further comprising a viscosity modifier.

7. An indirect ink-jet printing method, comprising:
    providing the jettable ink composition of claim 1;
    jetting said ink composition on a surface of an intermediate transfer member forming a film comprising an image thereon; and
    transferring said image to a printable substrate.

8. The method according to claim 7, wherein the film is a continuous film.

9. A method for making the jettable ink composition of claim 1, comprising:
    forming a dispersion of binder resin particles in a first hydrocarbon carrier liquid;
    forming a dispersion of pigment particles as colorant in a second hydrocarbon carrier fluid; and
    mixing the dispersions in amounts to form the jettable ink composition.

10. The method according to claim 9, wherein the binder resin particles comprise an ionomer resin, and forming a dispersion of binder resin particles in said first hydrocarbon resin comprises grinding/milling said ionomer resin in the presence of a dispersant for a period of time to reduce the mean particle size (d50) of the ionomer to less than about 1 μm.

11. The method according to claim 9, wherein the binder resin particles are derived from a polymer having acidic groups, and the method further comprises blocking at least a portion of said acidic side groups to reduce their acidity prior to forming a dispersion of binder resin particles in said first hydrocarbon carrier liquid.

12. The method according to claim 9, wherein the first hydrocarbon carrier liquid and/or the second hydrocarbon carrier liquid is an isoparaffinic hydrocarbon.

13. The method of claim 9, wherein mixing the dispersions in suitable amounts to form a jettable ink composition is carried out by shearing a mixture of the dispersions for a sufficient period of time to form said jettable ink composition.

14. The method of claim 9, further comprising combining the mixture of dispersions with a suitable amount of viscosity modifier to obtain a jettable ink composition having a viscosity of from about 2 to about 20 cps at 25° C.

15. A printed media substrate produced by the method of claim 7 or 8, wherein the printed media substrate has a layer comprising binder resin particles and coloured image, and wherein the colored image is formed from the jettable ink composition.

16. The jettable ink composition according to claim 1, wherein the jettable ink composition is obtained by:
 grinding or milling the pigment particles in a first hydrocarbon carrier liquid to form a dispersion of pigment particles;
 separately grinding or milling the resin particles in a second hydrocarbon carrier liquid to form a dispersion of resin particles; and
 mixing the dispersion of pigment particles and the dispersion of resin particles.

17. The jettable ink composition of claim 16, wherein the first hydrocarbon carrier liquid and the second hydrocarbon carrier liquid are different.

\* \* \* \* \*

UNITED STATES PATENT AND TRADEMARK OFFICE
CERTIFICATE OF CORRECTION

Page 1 of 1

PATENT NO. : 9,683,117 B2
APPLICATION NO. : 14/416987
DATED : June 20, 2017
INVENTOR(S) : Yaron Grinwald et al.

It is certified that error appears in the above-identified patent and that said Letters Patent is hereby corrected as shown below:

On the Title Page

In item (75), Inventors, in Column 1, Line 1, delete "Nes Ziona" and insert -- Ness Ziona --, therefor.

In item (75), Inventors, in Column 1, Line 2, delete "Nes Ziona" and insert -- Ness Ziona --, therefor.

In item (75), Inventors, in Column 1, Line 3, delete "Nes Ziona" and insert -- Ness Ziona --, therefor.

In item (75), Inventors, in Column 1, Line 4, delete "Nes Ziona" and insert -- Ness Ziona --, therefor.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*